UNITED STATES PATENT OFFICE.

GALEN HOWELL CLEVENGER, OF PALO ALTO, CALIFORNIA, ASSIGNOR TO HERBERT W. GEPP, OF MELBOURNE, VICTORIA, AUSTRALIA.

ELECTROLYTIC RECOVERY OF ZINC.

1,283,078. Specification of Letters Patent. Patented Oct. 29, 1918.

No Drawing. Application filed May 7, 1917. Serial No. 167,128.

*To all whom it may concern:*

Be it known that I, GALEN H. CLEVENGER, a citizen of the United States, residing at Palo Alto, in the county of Santa Clara, State of California, have invented certain new and useful Improvements in the Electrolytic Recovery of Zinc; and I do hereby declare the following to be a full, clear, and exact description of the invention, such as will enable others skilled in the art to which it appertains to make and use the same.

This invention relates to the electrolytic deposition of zinc from zinc electrolytes, and more particularly to the recovery of zinc from ores and electrolytes containing small amounts of cobalt.

The presence of cobalt in zinc electrolytes is indicated by a characteristic pitting and by irregularities in the deposition. It is the object of the present invention to overcome the objections and disadvantages incident to the presence of cobalt in the electrolyte, and, to that end, to provide a novel method of purifying the electrolyte and of recovering the zinc therefrom.

I have found that small amounts of cobalt can be readily removed from zinc electrolytes, and particularly zinc sulfate electrolytes, by means of nitroso beta naphthol.

I have discovered that the operation of precipitating a nitroso beta naphthol compound of cobalt from zinc electrolytes upon a large scale can be rendered practicable by effecting the formation of the nitroso beta naphthol in solution. The precipitation of cobalt takes place best in a slightly acid solution, and for this purpose a portion of the spent electrolyte may be used. Under these conditions copper and iron, if present, are precipitated as well as cobalt so that other metals than cobalt can be removed in the same manner.

When other impurities are present in the solution it is necessary to apply the common and well known methods of purification, such as precipitation by lime, calcium carbonate, and zinc dust.

My invention therefore includes the production *in situ* in the solution to be refined of nitroso beta naphthol, through the use of beta naphthol and a soluble nitrite, such as sodium nitrite, in the acidified solution, and to the refining or purifying of the electrolyte with the nitroso beta naphthol thus produced. By this method, the disadvantages of using the reagent in the ordinary form are overcome.

The beta naphthol used should be finely divided. This can be readily accomplished by grinding; or the finely divided product resulting from the proper sublimation of the crude product may be used. This, together with the necessary amount of acid, is added to the solution to be refined during agitation by air or mechanical means. In the case of zinc sulfate solutions, sulfuric acid is used. The necessary amount of sodium nitrite is dissolved in a separate portion of the solution before acidification, and added to the main body of the acidified solution to which the beta naphthol has previously been added.

The sodium nitrite reacts with the acid to form nitrous acid, which in turn combines with the beta naphthol to form nitroso beta naphthol. Contemporaneously with this reaction and later the nitroso beta naphthol formed combines with the cobalt to form the well known red precipitate of cobalti-nitroso beta naphthol.

The proportion of reagent necessary is dependent upon the amount of cobalt, as well as the amount of copper and iron present in the solution, both of the latter being precipitated by the reagent. Theoretically, a large proportion of reagent is required to form the precipitate. Actually a somewhat greater proportion is required to give complete precipitation of the cobalt. The precipitation may be carried on at ordinary temperatures or the solution may be heated after the reaction between the beta naphthol and the nitrous acid is more or less complete. Precipitation of cobalt by this reagent can be accomplished in zinc solutions to be electrolyzed without removal of manganese or interference of other ordinary elements aside from copper and iron, which, if desired, can be removed by other methods of refining prior to the cobalt precipitation, or, with a sufficiently low cost for reagents, this method may also be employed for removing small amounts of iron and copper.

The small amount of nitrogen remaining in the solution in the form of nitrite or nitrate after precipitation may accumulate to such an extent as to interfere with electrolysis, but can readily be converted into ammonia by treatment with zinc dust; in fact, zinc dust treatment of the solution advantageously follows this method of precipitation for the removal of other interfering elements. However, the cobalt may be precipitated after zinc dust treatment for the removal of cadmium, copper, lead, bismuth, arsenic, antimony, etc. In this case less reagent is required, but the risk is incurred of the concentration of nitrogen in undesirable combinations rising in the solution to a point where trouble might be occasioned in the electrolytic deposition of zinc.

In zinc sulfate solutions, I have obtained good deposits over a long period of time from solutions refined as previously described. At a current density of 25 ampere per square foot of cathode surface, current efficiencies of over 92% have been obtained.

The beta naphthol which is used in the production of the nitroso beta naphthol is available as an article of commerce, or it can readily be produced in accordance with well known methods, as, for example, from naphthalene.

I claim:—

1. In the electro-deposition of zinc, the method of removing cobalt from the electrolyte, which comprises precipitating the cobalt with nitroso-beta-naphthol by effecting the formation of nitroso-beta-naphthol within the electrolyte and precipitating the cobalt therewith.

2. In the electro-deposition of zinc, the method of removing cobalt from a zinc sulfate electrolyte, which comprises precipitating the cobalt by effecting the formation of nitroso-beta-naphthol within the electrolyte and precipitating the cobalt therewith.

3. In the electro-deposition of zinc, the method of removing cobalt from a zinc sulfate electrolyte, which comprises precipitating the cobalt by adding beta-naphthol and a soluble nitrite and thereby producing nitroso-beta-naphthol and precipitating the cobalt therewith.

4. In the electro-deposition of zinc, the method of removing cobalt from the electrolyte, which comprises precipitating the cobalt by effecting the formation of nitroso-beta-naphthol within the electrolyte and precipitating the cobalt therewith.

5. In the electro-deposition of zinc, the method of removing cobalt from the electrolyte, which comprises precipitating the cobalt by adding beta-naphthol and a soluble nitrite and thereby producing nitroso-beta-naphthol and precipitating the cobalt therewith.

6. In the electro-deposition of zinc, the method of removing cobalt from the electrolyte which comprises adding thereto finely divided beta-naphthol and acid with agitation, together with sodium nitrite, thereby forming nitroso-beta-naphthol and precipitating the cobalt therewith.

7. In the electro-deposition of zinc, the method of removing metals from the electrolyte, which comprises adding thereto beta-naphthol and a soluble nitrite and thereby forming nitroso-beta-naphthol and precipitating the metals therewith, and subjecting the electrolyte to a subsequent treatment with zinc dust.

8. In the electro-deposition of zinc, the method of removing metals from the electrolyte, which comprises precipitating the metals with nitroso-beta-naphthol by effecting the formation of nitroso-beta-naphthol within the electrolyte and precipitating the metals therewith.

9. In the electro-deposition of zinc, the method of removing metals from a zinc sulfate electrolyte, which comprises precipitating the metals by adding beta-naphthol and a soluble nitrite and thereby producing nitroso-beta-naphthol and precipitating the metals therewith.

10. In the electro-deposition of zinc, the method of removing metals from the electrolyte, which comprises precipitating the metals by adding beta-naphthol and a soluble nitrite and thereby producing nitroso-beta-naphthol and precipitating the metals therewith.

In testimony whereof I affix my signature.

GALEN HOWELL CLEVENGER.